(12) United States Patent
Doherty et al.

(10) Patent No.: US 7,150,347 B2
(45) Date of Patent: Dec. 19, 2006

(54) DRUM ASSEMBLY FOR A COUPLING ARRANGEMENT

(75) Inventors: Michael T. Doherty, Midland, MI (US); Thomas Meier, Rochester Hills, MI (US)

(73) Assignee: Means Industries, Inc., Saginaw, MI (US)

( * ) Notice: Subject to any disclaimer, the term of this patent is extended or adjusted under 35 U.S.C. 154(b) by 113 days.

(21) Appl. No.: 10/953,833

(22) Filed: Sep. 29, 2004

(65) Prior Publication Data

US 2006/0065506 A1 Mar. 30, 2006

(51) Int. Cl.
*F16D 25/12* (2006.01)
(52) U.S. Cl. ...................... 192/70.2; 192/112
(58) Field of Classification Search ............... 192/70.2, 192/112; 74/438
See application file for complete search history.

(56) References Cited

U.S. PATENT DOCUMENTS

| | | | |
|---|---|---|---|
| 1,531,158 A | | 3/1925 | Thorington |
| 1,998,613 A | * | 4/1935 | Ford .......................... 192/70.2 |
| 2,879,872 A | * | 3/1959 | Van Ranst .............. 192/104 R |
| 3,040,408 A | * | 6/1962 | Schon ......................... 74/377 |
| 4,111,291 A | | 9/1978 | Horstman |
| 4,353,705 A | | 10/1982 | Scott-Jackson et al. |
| 4,724,745 A | | 2/1988 | Sumiya et al. |
| 4,791,269 A | | 12/1988 | McLean et al. |
| 4,984,669 A | | 1/1991 | Hoffman |
| 5,388,474 A | | 2/1995 | Tanaka et al. |
| 6,058,591 A | | 5/2000 | Prater |
| 6,142,276 A | | 11/2000 | Pinschmidt et al. |
| 6,530,253 B1 | * | 3/2003 | Gotou et al. ............... 192/70.2 |
| 6,708,807 B1 | | 3/2004 | Martin |

FOREIGN PATENT DOCUMENTS

JP 6-74251 3/1994

\* cited by examiner

*Primary Examiner*—Rodney H. Bonck
(74) *Attorney, Agent, or Firm*—Brooks Kushman P.C.

(57) ABSTRACT

A drum assembly for use with a coupling arrangement includes an outer member and an inner member that is mountable on the outer member. The outer member includes first and second annular portions connected together. The first annular portion has a first mating surface that defines a first opening having a first diameter, and the second annular portion defining a second opening having a second diameter that is smaller than the first diameter. The inner member includes a generally radially extending portion and a flange portion extending generally axially from the radially extending portion. The radially extending portion includes a second mating surface that is engageable with the first mating surface to interlock the inner and outer members together. When the inner member is mounted on the outer member, the radially extending portion extends into the first opening, and the flange portion extends into the second opening.

21 Claims, 2 Drawing Sheets

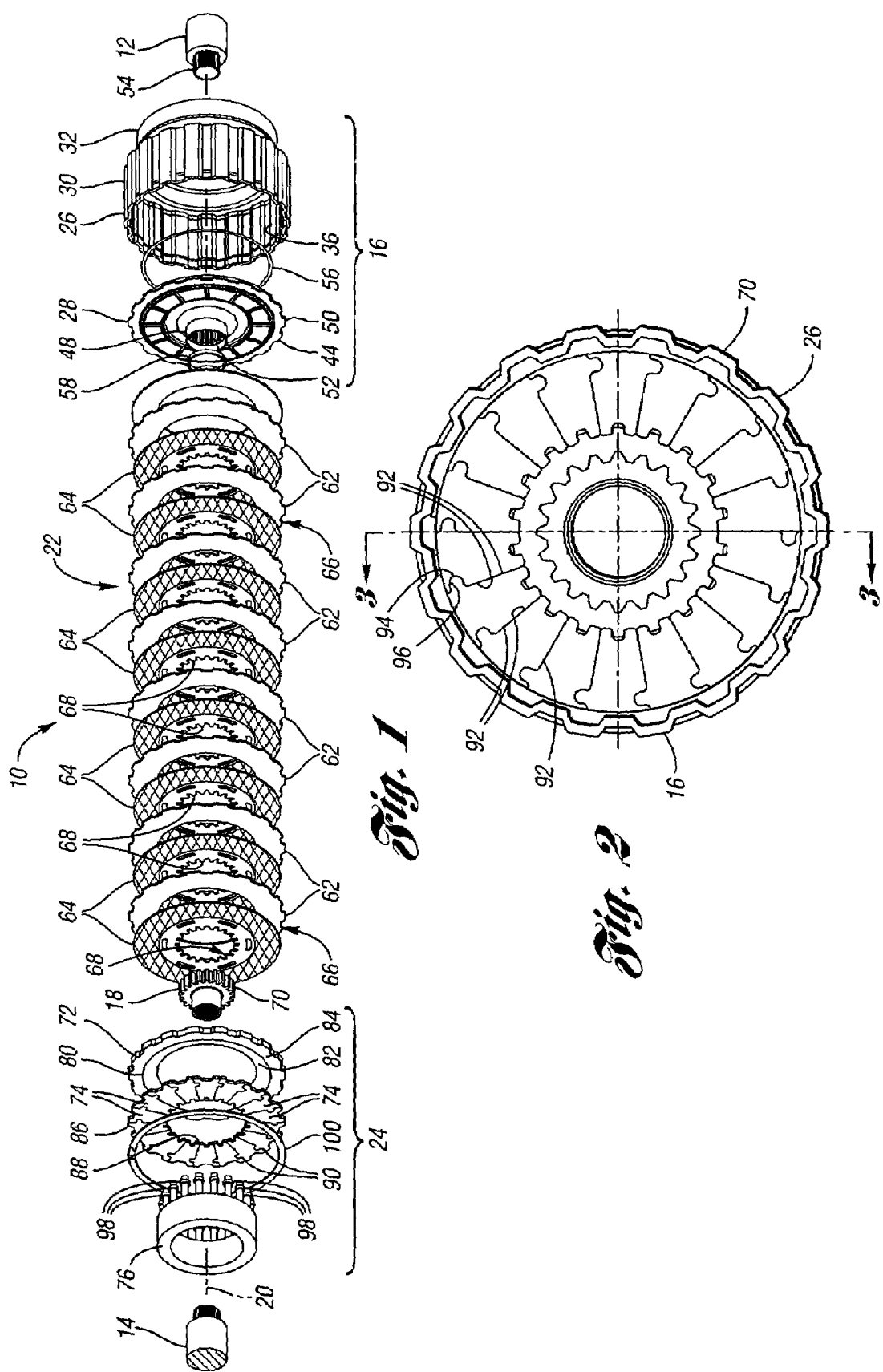

DRUM ASSEMBLY FOR A COUPLING ARRANGEMENT

BACKGROUND OF THE INVENTION

1. Field of the Invention

The invention relates to a drum assembly for use with a coupling arrangement.

2. Background Art

A clutch drum for housing a clutch pack may be formed as a single piece. For example, a cup-shaped structure may be stamped from sheet metal, and then roll formed, extruded, spun formed, etc. to form the clutch drum.

Examples of other clutch drums are disclosed in U.S. Pat. Nos. 1,531,158; 4,724,745; and 5,388,474.

SUMMARY OF THE INVENTION

Under the invention, a drum assembly for use with a coupling arrangement is provided. The drum assembly includes an outer member and an inner member that is mountable on the outer member. The outer member includes first and second annular portions connected together. The first annular portion has a first mating surface that defines a first opening having a first diameter, and the second annular portion defining a second opening having a second diameter that is smaller than the first diameter. The inner member includes a generally radially extending portion and a flange portion extending generally axially from the radially extending portion. The radially extending portion includes a second mating surface that is engageable with the first mating surface of the outer member to interlock the inner and outer members together. When the inner member is mounted on the outer member, the radially extending portion extends into the first opening, and the flange portion extends into the second opening.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is an exploded view of a coupling arrangement according to the invention, wherein the coupling arrangement includes a housing assembly, a coupling pack disposeable in the housing assembly, and an actuator assembly for compressing the coupling pack;

FIG. 2 is an end view of the coupling arrangement excluding an actuator of the actuator arrangement;

DETAILED DESCRIPTION OF THE PREFERRED EMBODIMENT(S)

Figure 4:
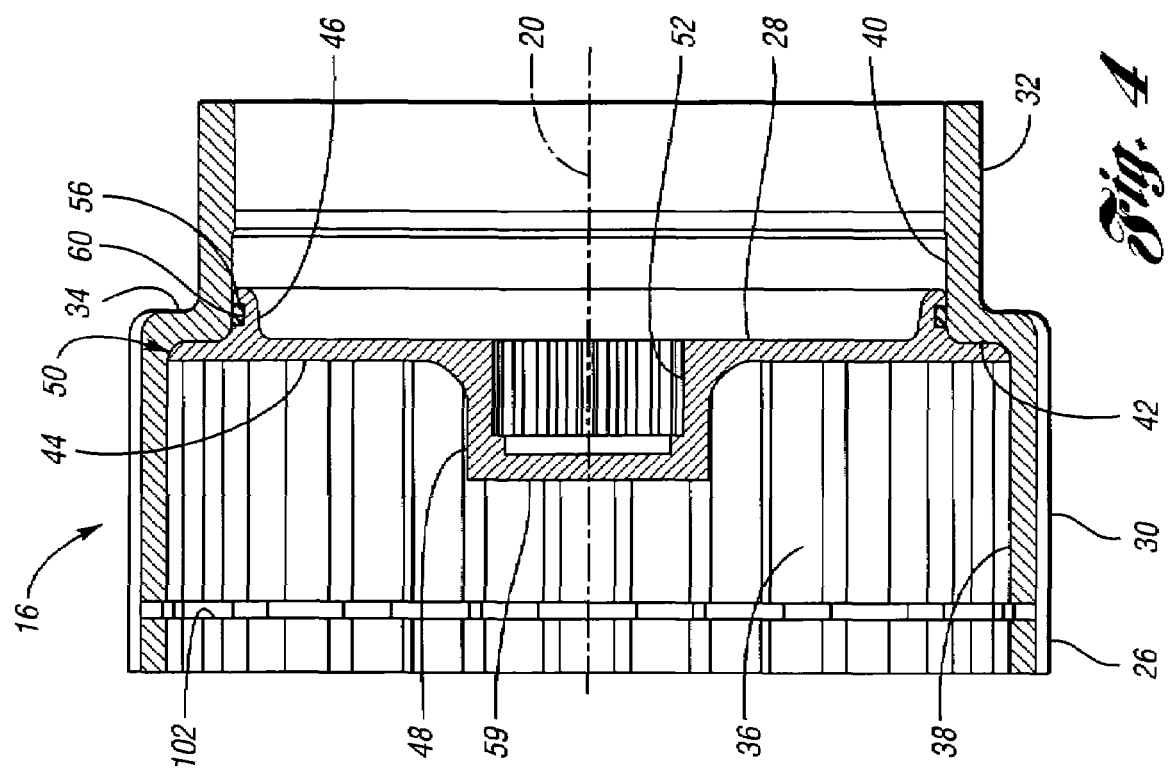
FIG. 4 is a cross-sectional view of the housing assembly.

FIG. 1 shows a mechanically applied coupling arrangement 10, such as a clutch or brake, constructed in accordance with the invention and configured to transmit torque between two members, such as a first and second shafts 12 and 14, respectively. One shaft 12, 14 may be a drive shaft, and the other shaft 12, 14 may be a driven shaft such that both shafts are moveable. As another example, one of the shafts 12, 14 may be stationary.

The coupling arrangement 10 includes a housing or drum assembly 16 and a hub 18 that are coupled to the first and second shafts 12 and 14, respectively, and that share a common central axis 20. Alternatively, the hub 18 may be formed as part of the second shaft 14. The coupling arrangement 10 further includes a coupling pack 22, such as a clutch pack or brake pack, disposed between the drum assembly 16 and the hub 18, and an actuator arrangement 24 for applying an axial load on the coupling pack 22 to couple together the drum assembly 16 and the hub 18.

The drum assembly 16 is configured to house the coupling pack 22 and includes first and second members, such as outer and inner members 26 and 28 respectively, that are connected together and aligned with respect to the axis 20. Referring to FIGS. 1–4, the outer member 26 includes first and second annular portions 30 and 32, respectively, and an intermediate portion 34 extending between the annular portions 30 and 32. The first annular portion 30 has a first mating surface 36, such as a splined inner surface, that defines a first opening 38 having a first diameter. The second annular portion 32 defines a second opening 40 having a second diameter that is smaller than the first diameter. If the annular portions 30 and 32 have varying or irregular surfaces, the first diameter may be the largest diameter of the first opening 38, and the second diameter may be the largest diameter of the second opening 40. The intermediate portion 34 defines a shoulder 42 that is engageable with the inner member 28.

The inner member 28 is mountable on the outer member 26 and includes a generally radially extending portion 44, an annular flange portion 46 extending generally axially from the radially extending portion 44 in a first direction, and a hub portion 48 extending generally axially from the radially extending portion 44 in a second direction different than the first direction. Alternatively, the hub portion 48 may extend generally axially in the first direction.

As shown in FIG. 4, when the inner member 28 is mounted on the outer member 26, the radially extending portion 44 extends into the first opening 38 and is engaged with the shoulder 42, and the flange portion 46 extends into the second opening 40. Furthermore, the radially extending portion 44 includes a second mating surface 50, such as a splined outer surface, that engages the first mating inner surface 36 of the outer member 26 to interlock the members 26 and 28 together.

The hub portion 48 is adapted to be connected to the first shaft 12 or other member. For example, the hub portion 48 may include a splined inner surface 52 that is engageable with a splined outer surface 54 of the first shaft 12. Furthermore, referring to FIG. 3, a bushing 55 may be positioned between the hub portion 48 and the hub 18 to allow rotational movement of these components with respect to each other.

Figure 3:
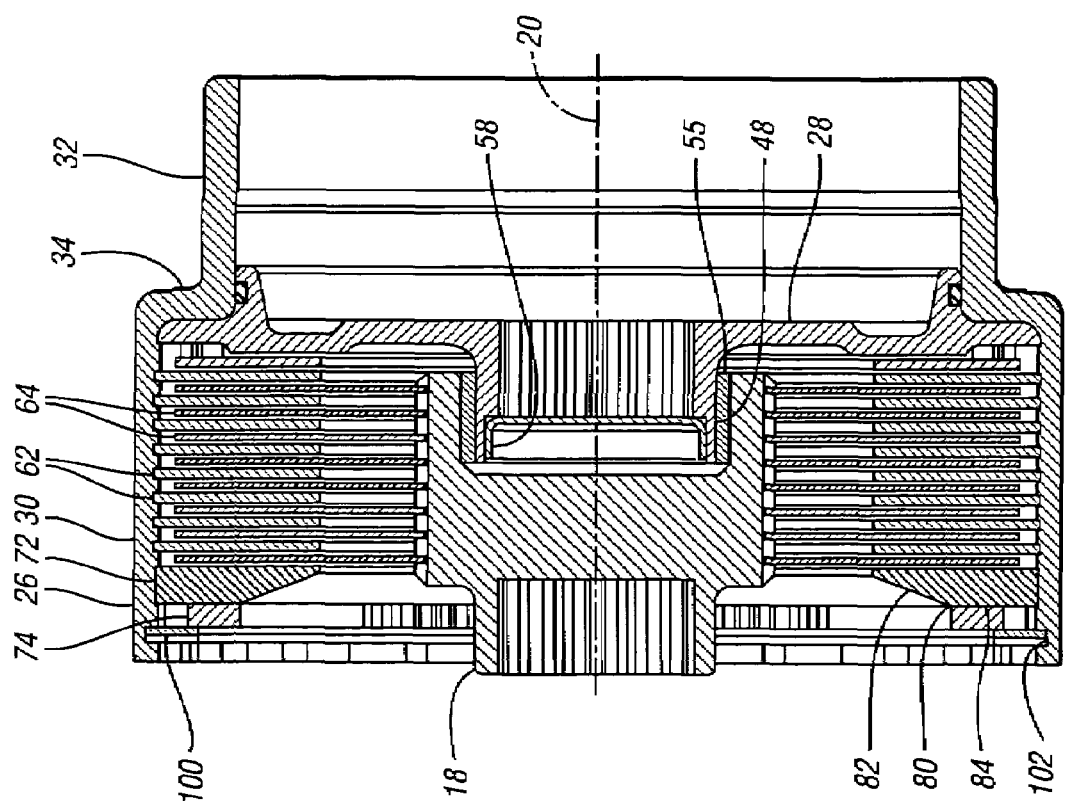
FIG. 3 is a cross-sectional view of the coupling arrangement taken along line 3—3 of FIG. 2.

The drum assembly 12 may further include first and second seals 56 and 58, respectively, for retaining lubricating fluid within the drum assembly 12. The first seal 56, which may be an O-ring for example, is positionable in a circumferential groove 60 formed in the flange portion 46 of the inner member 28. As shown in FIG. 4, the first seal 56 is disposed between the flange portion 46 and the second annular portion 32 of the outer member 26 when the inner member 28 is mounted on the outer member 26. The second seal 58 may be an O-ring, as shown in FIG. 1, or a cup-shaped seal, as shown in FIG. 3, that is mounted on the hub portion 48. Alternatively, as shown in FIG. 4, the hub portion 48 may be formed with a closed end 59 such that the second seal 58 is not needed.

The coupling pack 22 includes multiple first and second discs or plates 62 and 64, respectively, that are configured to be coupled together to transmit torque between the shafts 12 and 14, or other members. The first plates 62 are slidably connected to the outer member 26 of the drum assembly 16, and the second plates 64 are slidably connected to the hub 18. For example, each first plate 62 may have a mating outer surface 66, such as a splined surface, that is engaged with the first mating surface 36 of the outer member 26, and each second plate 64 may have a mating inner surface 68, such as a splined surface, that is engaged with a splined outer surface 70 of the hub 18.

The actuator arrangement 24 may have any suitable configuration sufficient to couple the plates 62 and 64 together, to thereby couple the shafts 12 and 14 together. In the embodiment shown in FIG. 1, for example, the actuator arrangement 24 includes an actuator ring 72, a set of actuator levers 74, and an actuator 76 for pivoting the actuator levers 74 about the actuator ring 72 to force the plates 62 and 64 together.

The actuator ring 72 has a mating outer surface 78, such as a splined surface, that mates with the first mating surface 36 of the outer member 26 to interlock the actuator ring 72 and the outer member 26. The actuator ring 72 further has a pivot edge 80, formed at the junction of frustoconical surface 82 and flat surface 84, about which the actuator levers 74 may pivot.

The actuator levers 74 are arranged in an annular ring about the axis 20, and each actuator lever 74 has an outer end 86 supported by the outer member 26 of the drum assembly 16, and an inner end 88 opposite the outer end 86. In the embodiment shown in FIG. 1, each outer end 86 has a pair of projections 90 for coupling with the first mating surface 36 of the drum assembly 16.

Each actuator lever 74 also has a pair of sides 92 that converge toward each other from its outer end 86 toward its inner end 88 as best illustrated in FIG. 2. The sides 92 of the actuator levers 74 have interlocking formations 94 and 96 that connect adjacent actuator levers 74 to each other and thereby maintain positioning of the actuator levers 74 with respect to the drum assembly 16.

In addition, each actuator lever 74 is engageable with the actuator 76. For example, each inner end 90 of each actuator lever 74 may have an opening, such as a recess or notch, for receiving a moveable actuating portion 98 of the actuator 76.

When the actuating portions 98 are moved toward the coupling pack 22, the actuator levers 74 pivot about the pivot edge 80 of the actuator ring 72 and compress the plates 62 and 64 together. As a result, the first shaft 12 may be rotationally coupled to the second shaft 14.

It is to be understood that when the shafts 12 and 14 are coupled together, the shafts 12 and 14 may eventually rotate at the same speed, which may be referred to as a synchronous coupling, or the shafts 12 and 14 may move at different speeds. For example, the coupling arrangement 10 may be configured to achieve a slip coupling between the shafts 12 and 14, in which relative sliding movement of the plates 62 and 64 may occur.

Additional details of the actuator arrangement 24 described above may be found in U.S. patent application Ser. No. 10/853,881, which is hereby incorporated by reference. Alternatively, the actuator arrangement 24 may have any suitable configuration, such as a mechanical, electrical and/or hydraulic actuator assembly.

The coupling arrangement 10 may further include a retainer 100, such as a snap ring, for retaining the components 62, 64, 72 and 74 within the drum assembly 16. The retainer 100 may be snap-fit into a circumferential groove 102 formed in the first annular portion 30 of the outer member 26 of the drum assembly 16.

With the multi-piece drum assembly 16 described above, a number of advantages may be realized. First, such a configuration offers design flexibility. For example, the configuration of the inner member 28 may be varied to accommodate different coupling arrangement applications, while utilizing the same configuration for the outer member 26.

Second, the members 26 and 28 may be made of different materials and by different processes. As a result, cost-effective materials and manufacturing methods may be utilized, while also obtaining accurate dimensions and design features where needed. For example, the outer member 26 may be made of sheet metal that is stamped to form a cup-shaped structure, and then spun formed, extruded, or roll formed to form the first mating surface 36. The inner member 28 may be formed of powdered metal using a casting process to obtain desired dimensions and features. Such a process may be advantageous in forming the embodiment shown in FIG. 4, for example, in which the hub portion 48 of the inner member 28 has closed end 59.

Alternatively, each member 26 and 28 may be formed of any suitable material using any suitable manufacturing method. For example, the outer member 26 may be formed using a casting process, and the inner member 28 may made of stamped sheet metal. As another example, both members 26 and 28 may be made of a cast material or stamped sheet metal.

Third, the members 26 and 28 are configured to interlock securely together, such that a tight seal is formed between the members 26 and 28. Furthermore, the shoulder 42 formed on the outer member 26 inhibits axial movement of the inner member 28 when the coupling arrangement 10 is assembled together.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A drum assembly for use with a coupling arrangement, the drum assembly comprising:
    an outer member including first and second annular portions connected together, the first annular portion having a first mating surface that defines a first opening having a first diameter, and the second annular portion defining a second opening having a second diameter that is smaller than the first diameter; and
    an inner member that is mountable on the outer member, the inner member including a generally radially extending portion and a flange portion extending generally axially from the radially extending portion, the radially extending portion including a second mating surface that is engageable with the first mating surface of the outer member to interlock the inner and outer members together, wherein when the inner member is mounted on the outer member, the radially extending portion extends into the first opening, and the flange portion extends into the second opening;
    wherein the outer member includes an intermediate portion extending between the annular portions, the intermediate portion defining a shoulder, and wherein the radially extending portion of the inner member has a generally axially facing surface that engages the shoulder when the inner member is mounted on the outer member.

2. The drum assembly of claim 1 wherein the flange portion of the inner member has a circumferential groove, and the drum assembly further includes a seal that is positionable in the groove, wherein the seal is configured to be disposed between the flange portion of the inner member and the second portion of the outer member when the inner member is mounted on the outer member.

3. The drum assembly of claim 1 wherein the first and second mating surfaces are splined surfaces.

4. The drum assembly of claim 1 wherein the inner member further includes a hub portion extending generally axially from the radially extending portion, the hub portion being adapted to engage a shaft.

5. The drum assembly of claim 4 wherein the flange portion extends generally axially from the radially extending portion in a first direction, and the hub portion extends generally axially from the radially extending portion in a second direction opposite the first direction.

6. The drum assembly of claim 4 wherein the hub portion includes a splined inner surface.

7. The drum assembly of claim 1 wherein the outer and inner members comprise different materials.

8. The drum assembly of claim 7 wherein one of the outer and inner members comprises stamped sheet metal.

9. The drum assembly of claim 8 wherein the other of the outer and inner members comprises cast material.

10. The drum assembly of claim 7 wherein the outer member comprises stamped sheet metal, and the inner member is made from powdered metal.

11. A drum assembly for use with a coupling arrangement having a coupling pack, the drum assembly comprising:
    an outer member configured to receive the coupling pack, the outer member including first and second annular portions and an intermediate portion extending between the annular portions, the first annular portion having a splined inner surface that defines a first opening having a first diameter, the second annular portion defining a second opening having a second diameter that is smaller than the first diameter, and the intermediate portion defining a shoulder that is configured to face toward the coupling pack; and
    an inner member that is mountable on the outer member, the inner member including a generally radially extending portion, a flange portion extending generally axially from the radially extending portion in a first direction, and a hub portion extending generally axially from the radially extending portion in a second direction different than the first direction, the radially extending portion including a splined outer surface that is engageable with the splined inner surface of the outer member, wherein when the inner member is mounted on the outer member, the radially extending portion is disposed in the first opening and engaged with the shoulder, and the flange portion is disposed in the second opening.

12. A coupling arrangement comprising:
    a drum assembly including an outer member and an inner member mounted on the outer member, the outer member including first and second annular portions connected together, the first annular portion having a mating inner surface that defines a first opening having a first diameter, and the second annular portion defining a second opening having a second diameter that is smaller than the first diameter, the inner member including a generally radially extending portion and a flange portion extending generally axially from the radially extending portion, the radially extending portion including a mating outer surface engaged with the mating inner surface of the outer member such that the inner and outer members are interlocked together, and the flange portion extending into the second opening; and
    a coupling pack including multiple plates disposed in the drum assembly, the plates being engageable with each other to transmit torque;
    wherein the outer member of the drum assembly includes an intermediate portion extending between the annular portions, the intermediate portion defining a shoulder that faces toward the coupling pack, and wherein the radially extending portion of the inner member is engaged with the shoulder.

13. The coupling arrangement of claim 12 wherein the flange portion of the inner member has a circumferential groove, and the drum assembly further includes a seal positioned in the groove such that the seal is disposed between the flange portion of the inner member and the second portion of the outer member.

14. The coupling arrangement of claim 12 wherein the mating inner and outer surfaces of the drum assembly are splined surfaces.

15. The coupling arrangement of claim 12 wherein the inner member of the drum assembly further includes a hub portion extending generally axially from the radially extending portion, the hub portion being adapted to engage a shaft.

16. The coupling arrangement of claim 15 wherein the flange portion of the drum assembly extends generally axially from the radially extending portion in a first direction, and the hub portion extends generally axially from the radially extending portion in a second direction opposite the first direction.

17. The coupling arrangement of claim 15 wherein the hub portion includes a splined inner surface.

18. The coupling arrangement of claim 12 wherein the multiple plates include multiple first plates and multiple second plates, the first plates mating with the mating inner surface of the outer member of the drum assembly, and the second plates being adapted to mate with a shaft.

19. The coupling arrangement of claim 12 wherein one of the outer and inner members comprises stamped sheet metal.

20. The coupling arrangement of claim 19 wherein the other of the outer and inner members comprises cast material.

21. The coupling arrangement of claim 19 wherein the other of the outer and inner members is made from powdered metal.

* * * * *